United States Patent [19]

Ishida et al.

[11] Patent Number: 5,429,556
[45] Date of Patent: Jul. 4, 1995

[54] INTERNALLY MESHING PLANETARY GEAR STRUCTURE AND FLEXIBLE MESHING TYPE GEAR MESHING STRUCTURE

[75] Inventors: Toshihiro Ishida; Yuzo Ogura; Akira Hirao, all of Ohbu, Japan

[73] Assignee: Sumimoto Heavy Industries, Ltd., Tokyo, Japan

[21] Appl. No.: 334,340

[22] Filed: Nov. 2, 1994

Related U.S. Application Data

[62] Division of Ser. No. 71,019, Jun. 2, 1993, Pat. No. 5,388,483.

Foreign Application Priority Data

Jun. 3, 1992 [JP] Japan ............... 4-142515
Jul. 29, 1992 [JP] Japan ............... 4-202295

[51] Int. Cl.$^6$ ............... F16H 1/32
[52] U.S. Cl. ............... 475/180
[58] Field of Search ............... 475/180

[56] References Cited

U.S. PATENT DOCUMENTS

| | | | |
|---|---|---|---|
| 3,660,917 | 5/1972 | Bevan | 40/33 |
| 3,744,941 | 7/1973 | Nestor | 418/61 |
| 3,998,112 | 12/1976 | Pierrat | 475/180 |
| 4,117,746 | 10/1978 | Pierrat | 475/180 |
| 4,487,091 | 12/1984 | Pierrat | 475/180 |
| 4,524,644 | 6/1985 | Pierrat | 475/180 |
| 4,549,450 | 10/1985 | Pierrat | 475/180 |
| 4,561,833 | 12/1985 | Miegishi | 418/61 B |
| 4,584,904 | 4/1986 | Distin, Jr. et al. | 475/180 |
| 4,673,342 | 6/1987 | Saegusa | 418/150 |

*Primary Examiner*—Dirk Wright
*Attorney, Agent, or Firm*—Nikaido, Marmelstein, Murray & Oram

[57] ABSTRACT

An internally meshing planetary gear structure or a flexible meshing type gear meshing structure is intended to achieve the lightening, miniaturization and high load capacity by increasing the meshing points of the gear even is the difference in the teeth number between the external gear and the internal gear is two or more. The difference in the teeth number between each of the external gears and the internal gear is set to be N (N: integer being two or more), the tooth profile of the external gear is constructed on the basis of the innermost curve of the epitrochoid parallel curves in N pieces which are superposed to be shifted in phase from each other, and the tooth profile of the internal gear is constructed on the basis of the innermost curve of the trochoid internally enveloping curves in N pieces which mesh with the above epitrochoid parallel curves and which are superposed to be shifted from each other by the same phase as in the external gear.

2 Claims, 17 Drawing Sheets

INTERNALLY MESHING PLANETARY GEAR STRUCTURE AND FLEXIBLE MESHING TYPE GEAR MESHING STRUCTURE

This is a division of application Ser. No. 08/071,019 filed Jun. 2, 1993, now U.S. Pat. No. 5,388,483.

BACKGROUND OF THE INVENTION

1. Field of the Invention

The present invention relates to the structure of the tooth profile of an internally meshing planetary gear structure suitable for a small sized reduction or speed up gear, and also relates to a flexible meshing type gear meshing structure, that is, the so-called wave gear structure.

2. Description of the Prior Art

There has been known a parallel type internally meshing planetary gear structure. It includes a first shaft, eccentric bodies rotated by the first shaft, plural external gears mounted around the eccentric bodies through bearings so as to be eccentrically rotatable, an internal gear internally meshing with the external gears through internal teeth constituted of external pins, and a second shaft connected to the external gears through internal pins for taking out only the rotational component of the external gears.

One known arrangement of this structure is shown in FIGS. 11 and 12. In this structure, the first shaft is taken as an input shaft, and the second shaft is taken as an output shaft. Further, the internal gear is fixed. Thus, the above structure is applied to the reduction gear.

Eccentric bodies 3a and 3b are fitted to an input shaft 1 with a specified phase difference (180°, in this structure). The eccentric bodies 3a and 3b (center: $O_2$) are eccentric with the input shaft 1 (center: $O_1$) by an eccentric amount $e$, respectively. Two external gears 5a and 5b are mounted around the eccentric bodies 3a and 3b through bearings 4a and 4b in a parallel manner (double row manner). Plural internal roller holes 6a and 6b are provided on the external gears 5a and 5b, respectively. An internal pin 7 and an internal roller 8 are inserted in each of the internal roller holes 6a and 6b.

The disposition of two external gears (double row) is mainly intended to increase the transmission capacity, to keep the strength, and to hold the rotational balance.

External teeth 9, each having a trochoid tooth profile (epitrochoid parallel curve tooth profile), are provided around the outer periphery of each of the external gears 5a and 5b. The external teeth 9 internally mesh with an internal gear 10 fixed to a casing 12.

The internal pins 7 passing through the external gears 5a and 5b are rigidly fixed to or inserted in a flange portion of the output shaft 2.

As the input shaft 1 is rotated by one time, the eccentric bodies 3a and 3b are rotated by one time. By one rotation of the eccentric bodies 3a and 3b, the external gears 5a and 5b are intended to be swayingly rotated around the input shaft 1; however, since the rotation is restricted by the internal gear 10, the external gears 5a and 5b are substantially only swayed while internally meshing with the internal gear 10.

For example, assuming that the teeth number of the external gears 5a and 5b is taken as n (n=21, in this figure) and the teeth number of the internal gear 10 is taken as n+1, the difference in the teeth number is 1. Accordingly, for each rotation of the input shaft 1, the external gears 5a and 5b are shifted (rotated) from the internal gear 10 fixed to the casing 12 by one tooth. This means that one rotation of the input shaft 1 is reduced to the rotation of $-1/n$ of the external gears 5a and 5b.

In the rotation of the external gears 5a and 5b, the swaying component is absorbed by gaps among the internal roller holes 6a and 6b and internal pins 7 (internal rollers 8), and only the rotational component is transmitted to the output shaft 2 through the internal pins 7.

As a result, the reduction with a reduction ratio of $-1/n$ is achieved.

The internally meshing planetary gear structure described above is applied to various types of reduction or speed up gears. In the above structure, the first and the second shafts are respectively taken as the input and output shafts, and the internal gear is fixed. However, the first shaft and the internal gear may be respectively taken as the input and output shafts, and the second shaft is fixed, to constitute the reduction gear. Further, in the above structures, the speed up gear may be constructed by replacing the input side by the output side.

In the internally meshing planetary gear structure of this type, the allowable load is almost determined depending on the magnitude of the surface pressure applied on the tooth surface. This has a limitation to the miniaturization of the device and to the enhancement of the load capacity. Thus, it has been required to reduce the surface pressure applied to the tooth surface.

To meet the above requirement, there has been proposed such a technique as disclosed in Japanese Patent Publication No. sho 63-4056. In this technique, an epitrochoid parallel curve (see FIG. 14) is used as the tooth profile of external teeth of an external gear, and a trochoid internally enveloping line (see FIG. 15) is used as the tooth profile of internal teeth 11 of an internal gear. As a result, the meshing points (contact points) between respective teeth of the external gear and the internal gear are increased to be two points. This makes it possible to reduce the surface pressure applied to the tooth surface.

More specifically, in this technique, as shown in FIG. 13, the tooth profile of the external teeth 9 of the external gears 5a and 5b is constituted of an epitrochoid parallel curve. On the other hand, the tooth profile of the internal teeth 11 of the internal gear 10 is constituted of a trochoid internally enveloping line composed of circular arc tooth profile portions P and P at both ends and a tooth profile portion Q at the intermediate portion (this portion is mated to the tooth profile of the external teeth which is constituted of the epitrochoid parallel curve).

In the gear structure using the above tooth profiles, at the meshing portion between the internal gear 10 and each of the external gears 5a and 5b, the contact points (meshing points) becomes two points in the area effective for the load transmission. Namely, there appears the contact point at the tooth profile portion Q other than the circular arc tooth profile portion P. Since these two contact points satisfy the condition of the tooth profile in terms of the gear mechanism, they act effectively to transmit the power.

Thus, in the internally meshing planetary gear structure of the above prior art, the improvement of the tooth profiles makes possible the contact at two points. Therefore, it is possible to reduce the surface pressure applied to the tooth surface, resulting in the miniaturization of the device and in the enhancement of the load capacity.

However, even using the above tooth profiles, there is a limitation to the enhancement of the load ability on the tooth surface yet. Thus, the higher load ability on the tooth surface has been required to further achieve the miniaturization and lightening of the reduction gear.

On the other hand, as a flexible meshing type gear meshing structure, there has been known such a technique as described in Japanese Patent Laid-open No. sho 63-130949. Hereinafter, this technique will be explained.

FIG. 16 is a sectional view showing the structure according to the prior art; and FIG. 17 is a sectional view taken along the line XVII—XVII of FIG. 16. In general, this structure is called as a wave gear structure.

An external spline 22A is provided on an input rotating shaft 21. It is connected to an internal spline 22B provided on an eccentric body 23 as a wave generator. An eccentric body bearing 24 is provided around the outer periphery of the eccentric body 23. An external gear 28 is provided around the outer periphery of the eccentric body bearing 24. The external gear 28 is constituted of a flange portion 29, annular portion 30 and an external teeth portion 31. The external teeth portion 31 is positioned around the outer periphery of an outer ring 27 of the eccentric body bearing 24.

In the above, the outer ring 27, annular portion 30 and the external teeth portion 31 are able to be flexibly deformed. External teeth 31A provided around the external teeth portion 31 are constituted of a trochoid tooth profile or the like. The external teeth 31A mesh with internal teeth 33A constituted of pins rotatably supported by the internal gear 32.

The external teeth 31A is smaller in the teeth number than the internal teeth (pins) of the internal gear 32 by two pieces. The configuration of the external teeth 31A is so constructed that two of the epitrochoid curves in which the radius ratio between the rolling circle and the base circle is an integer are superposed to be shifted in phase from each other, and the innermost one of the superposed curves is taken as the tooth profile curve. This configuration is disclosed in Japanese Patent Publication No. 1208548.

The rotation is transmitted from the input rotating shaft 21 to the wave generator (eccentric body 23). The eccentric body 23 deforms the external teeth portion 31 of the external gear 28 through the eccentric gear bearing 24. As the external teeth portion 31 is deformed by the projecting portions of the eccentric body 23, the external teeth 31A mesh with the internal teeth (pins) 33. Accordingly, the external teeth portion 31 is shifted in phase by the difference in the teeth number between the external teeth 31A and the pins 33A during one rotation of the eccentric body 23. By such shifting, the external gear 28 is rotated, which is transmitted to the output shaft 34. Specifically, in this example, the teeth number of the external teeth 31A is 100, and the teeth number of the internal teeth (pins) 33A is 102. Consequently, the difference in the teeth number is 2, so that the reduction ratio is $(-2/100 = -1/50)$.

Here, the internal gear 32 is fixed. However, as for the external gear 28 and the internal gear 32, if one is fixed, the other relatively becomes the output side. Also, if the output shaft is taken as the input side, the input rotating shaft becomes the output shaft for taking out the increased output.

In the prior art gear device as explained above, the internal teeth (pins) 33A constituting the circular arc tooth profile portion of the internal gear mesh with the external teeth 31A of the external gear 28 having the trochoid tooth profile or the like. Accordingly, the internal gear 32 is contacted with the external gear 28 at one contact point.

As a result, in the internal gear 32 constituted of the circular arc tooth profile having the same radius, the allowable load is almost determined depending on the restriction of the surface pressure applied to the tooth surface. This has a limitation to the miniaturization of the wave gear device and the enhancement of the load capacity.

In a planetary reduction gear using a circular arc tooth profile (external pins) as the internal gear tooth profile and a torochoid teeth profile as the external gear tooth profile (this is well known as the trademark registration "CYCLO" reduction gear according to the present applicant), as described above, the above problem (limitation in the load applied to the tooth surface) has been solved by the improvement of the tooth profile as shown in Japanese Patent Publication No. sho 63-4056.

Namely, as described above with reference to FIG. 13 showing the meshing state of the above tooth profiles, in this planetary reduction gear, the epitrochoid parallel curve (see FIG. 14) is used as the external gear tooth profile 9 and a trochoid internally enveloping line (see FIG. 15) is used as the internal gear tooth profile 11. This makes it possible to increase the meshing points between the external gear and the internal gear at two points, and hence to achieve the improvement of the load applied on the tooth surface.

Accordingly, it may be considered that the above problem is solved by applying the above tooth profiles to the above wave gear device.

However, in the above planetary reduction gear, the difference in the teeth number between the external gear and the internal gear is one. On the other hand, in the wave gear device, the difference in the teeth number must be an integer being two or more. Namely, in the wave gear device, it is preferred that the difference in the teeth number is the integer magnification of the number of the projecting portions of the eccentric body 23 as the wave generator. Since the number of the projecting portions of the eccentric body is two or more for balancing the load, so that the difference in the teeth number becomes an integer being 2 or more.

Therefore, the above tooth profiles cannot be directly applied to the wave gear device as they are.

SUMMARY OF THE INVENTION

Taking the above into consideration, the present invention has been made. Accordingly, a primary object of the present invention is to provide an internally meshing planetary gear structure, wherein the difference in teeth number is set to be two or more, and even in such a case, the tooth profiles are so constructed that the external teeth are contacted with the internal teeth at two points, thereby realizing the lightweight, compact, and high performance structure.

A secondary object of the present invention is to provide a flexible meshing type gear meshing structure, wherein the internal teeth and the external teeth are constructed on the basis of the tooth profiles used in the prior art internally meshing planetary reduction gear, thereby realizing the lightweight, compact and high performance reduction or speed up gear.

In the present invention, there is provided an internally meshing planetary gear structure comprising:
a first shaft;

plural external gears mounted around the first shaft through plural eccentric bodies provided around the first shaft so as to be eccentrically rotatable;

an internal gear internally meshing with the external gears; and a second shaft connected to the external gears through means for transmitting only rotational component of the external gears;

wherein the difference in the teeth number between the external gear and the internal gear is set to be N (N: integer being two or more);

the tooth profile of the external gear is constructed on the basis of the innermost curve of the epitrochoid parallel curves in N pieces which are superposed to be shifted in phase from each other; and the tooth profile of the internal gear is constructed on the basis of the innermost curve of the trochoid internally enveloping curves in N pieces which mesh with the above epitrochoid parallel curves and which are superposed to be shifted from each other by the same phase as in the external gear.

Further, in the present invention, there is provided a flexible meshing type gear meshing structure comprising:

an internal gear having a rigidity;

a flexible external gear internally meshing with the internal gear; and a wave generator for flexibly deforming the external gear;

wherein the difference in the teeth number between the external gear and the internal gear is set to be N (N: integer being two or more);

the tooth profile of the external gear is constructed on the basis of the innermost curve of the epitrochoid parallel curves in N pieces which are superposed to be shifted in phase from each other; and the tooth profile of the internal gear is constructed on the basis of the innermost curve of the trochoid internally enveloping curves in N pieces which mesh with the above epitrochoid parallel curves and which are superposed to be shifted from each other by the same phase as in the external gear.

According to the present invention, in the internally meshing planetary gear structure, since the difference in the teeth number between the external gear and the internal gear is set to be N (integer being two or more), the external gear is shifted (rotated)-from the internal gear by the teeth number of N for each rotation of the input shaft. Therefore, in the case of obtaining the same reduction ratio as in the case that the difference in the teeth number is one, it is possible to increase the teeth number of the internal gear and the external gear by the magnification of N as compared with the prior art in addition to two points meshing. This makes it possible to increase the meshing teeth number in the area effective for the load transmission, and to reduce the meshing in the area not effective for the power transmission and being larger in sliding. Therefore, it is possible to reduce the surface pressure at the contact point and to reduce the loss in the power transmission.

Incidentally, in the technique as shown in Japanese Patent Publication No. sho 63-4056 described above, the difference in the teeth number is one. It is difficult to apply this technique to the case that the difference in the teeth number N is two or more as it is. In this regard, according to the the present invention, by use of the above construction, the external gear can be contacted with the internal gear at two points in the area effective for the load transmission even if the difference in the teeth number N is two or more.

On the other hand, according to the present invention, in the flexible meshing type gear meshing structure, the tooth profiles as described in Japanese Patent Publication No. sho 63-4056 can be preferably applied to the wave gear device having the difference in the teeth number being two or more. As a result, the external teeth of the external gear can be contacted (meshed) with the internal teeth of the internal gear at the multipoints in the area effective for the load transmission.

In addition, when the phase-shifting amounts of the epitrochoid parallel curves in N pieces according to the external gear, and the trochoid internally enveloping lines in N pieces according to the internal gear are respectively set to be 1/N of one tooth, it is possible to keep the strength and the other characteristics at the same level for all the teeth.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENT

Hereinafter, one embodiment will be explained with reference to the accompanying drawings.

Figure 11:
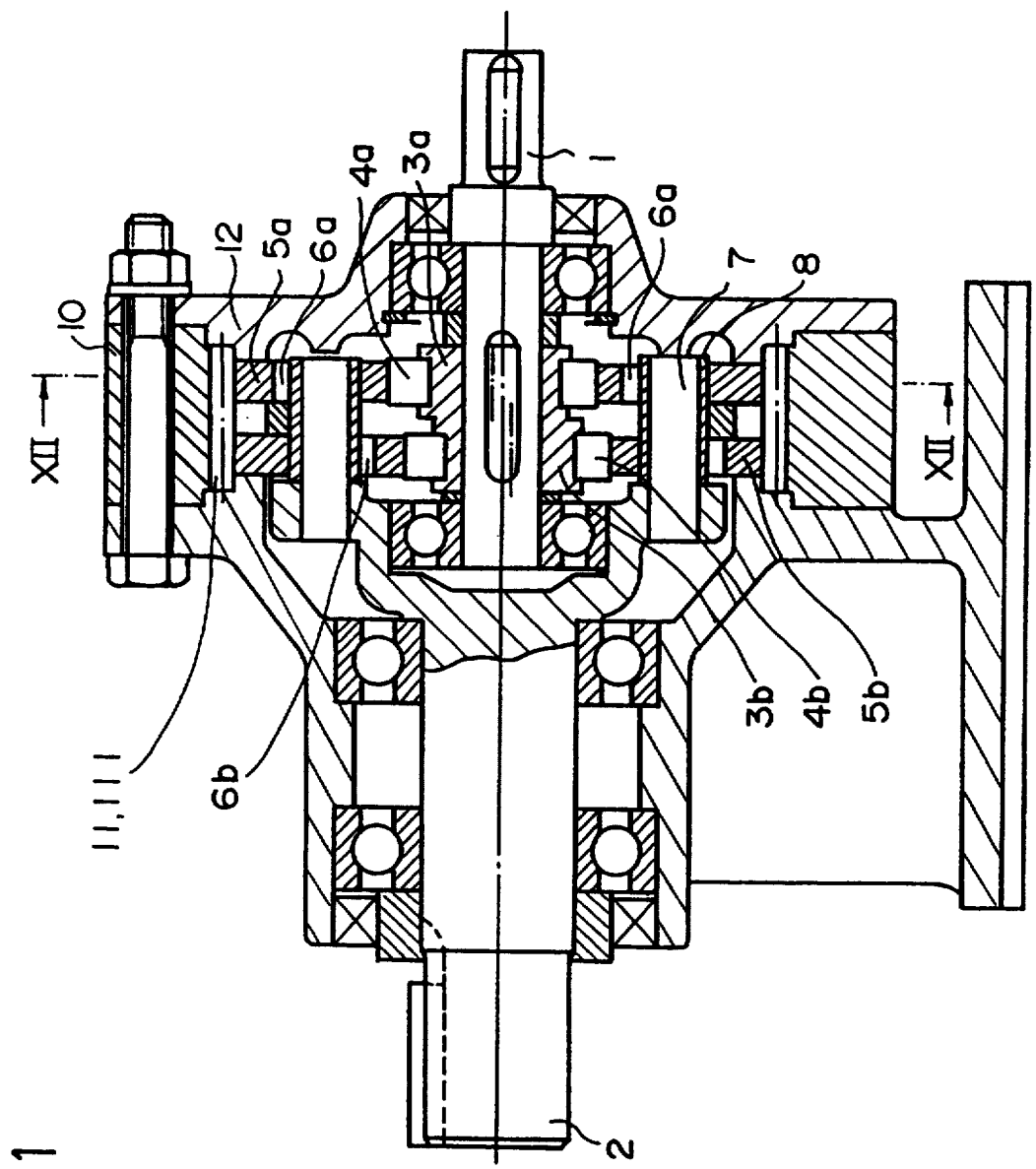
FIG. 11 is a sectional view showing the whole construction of an example of the internally meshing planetary gear structure common to the embodiment of the present invention and the prior art.
Figure 12:
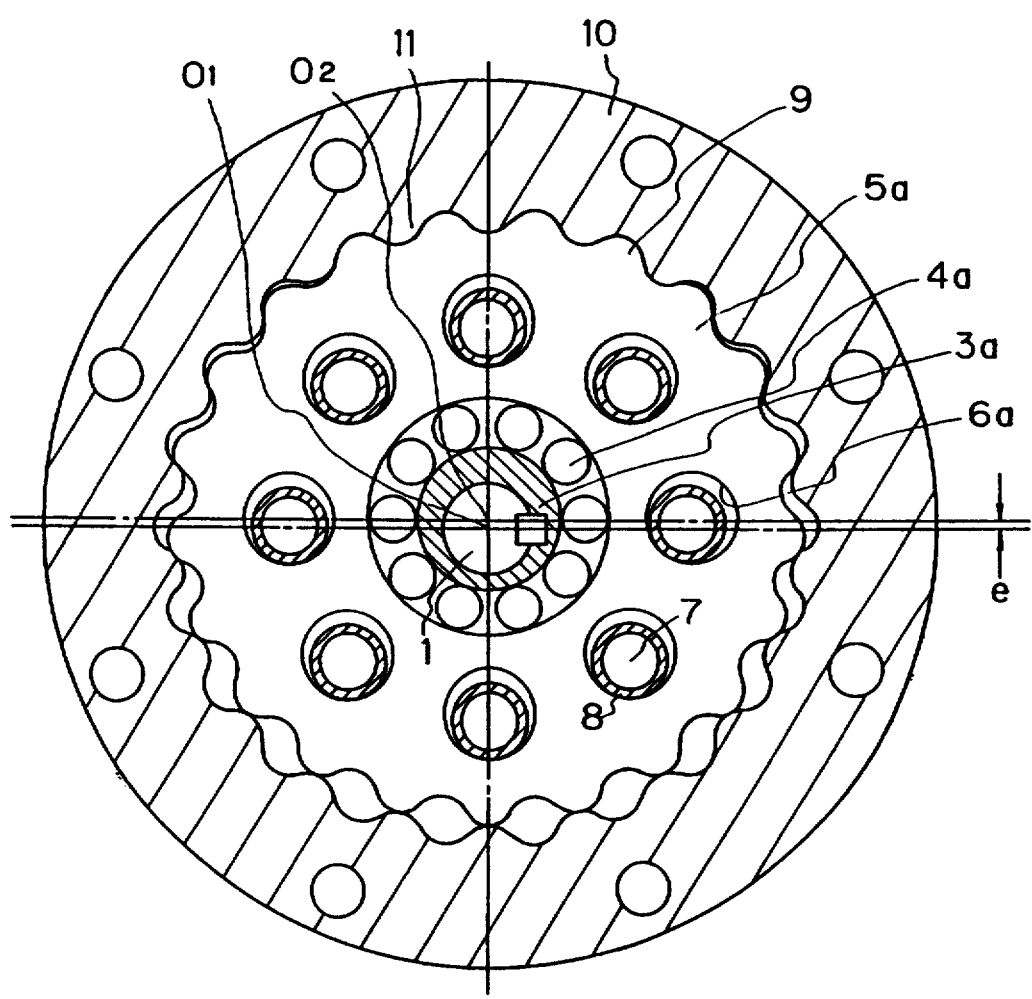
FIG. 12 is a sectional view taken along the line XII—XII of FIG. 11 according to the prior art structure.
Figure 13:
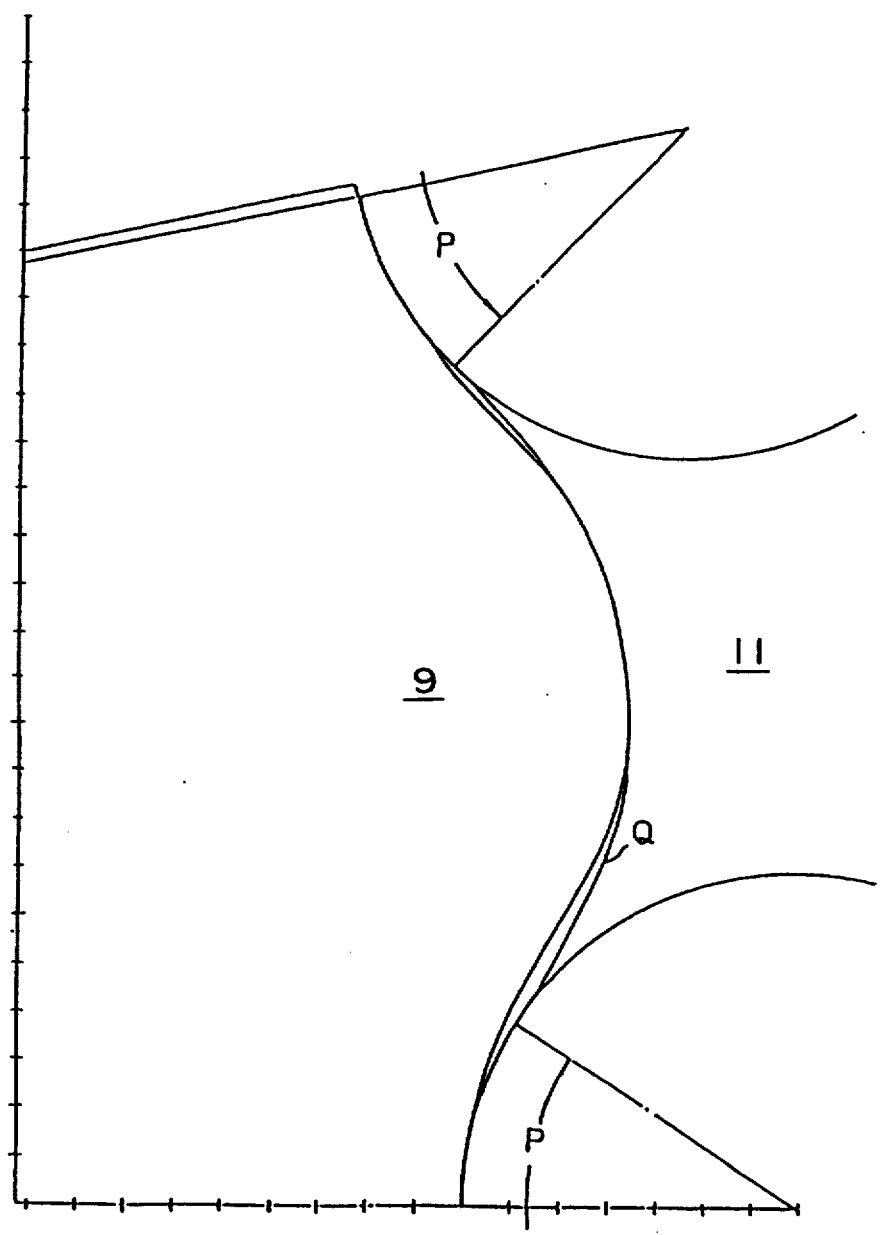
FIG. 13 is a view of a meshing portion between the external gear and the internal gear according to the the prior art.

A gear meshing structure of this embodiment has the same construction as that shown in FIGS. 11, 12, except that the tooth profile of external-teeth (indicated at numeral 109) and the tooth profile of internal teeth (indicated at numeral 111) are different from those in the prior art. Accordingly, there will be mainly explained the tooth profiles of the external teeth 109 and internal teeth 111, and the other explanation will be omitted.

In this embodiment, the teeth number of external gears 5a and 5b is 42, and the teeth number of an internal gear 10 is 44. Thus, the difference in the teeth number is 2.

Figure 1:
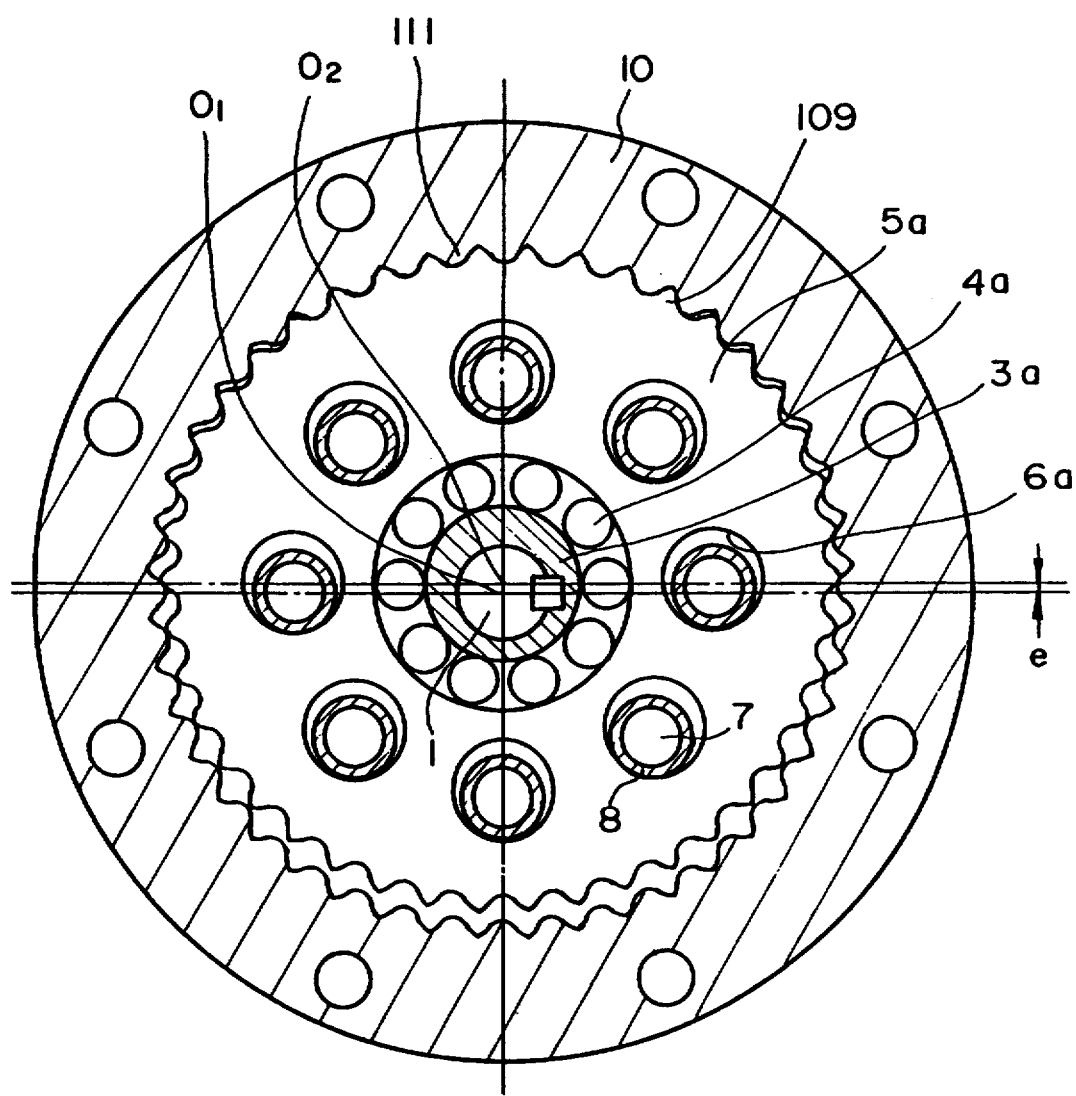
FIG. 1 is a sectional view showing the main part of one embodiment of the present invention, which is equivalent to the section taken along the line XII—XII of FIG. 11.
Figure 2:
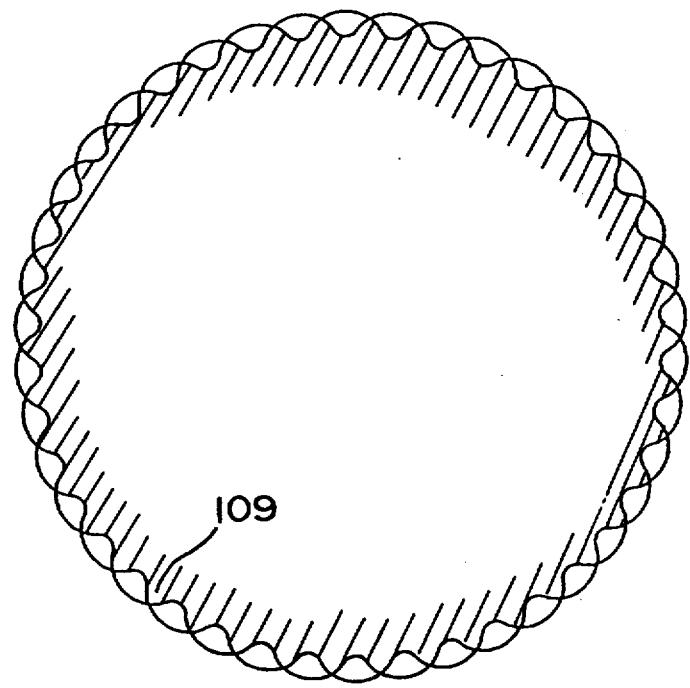
FIG. 2 is an enlarged view of the tooth profile (formed by superposing epitrochoid parallel curves) of external teeth of each external gear in the embodiment.
Figure 3:
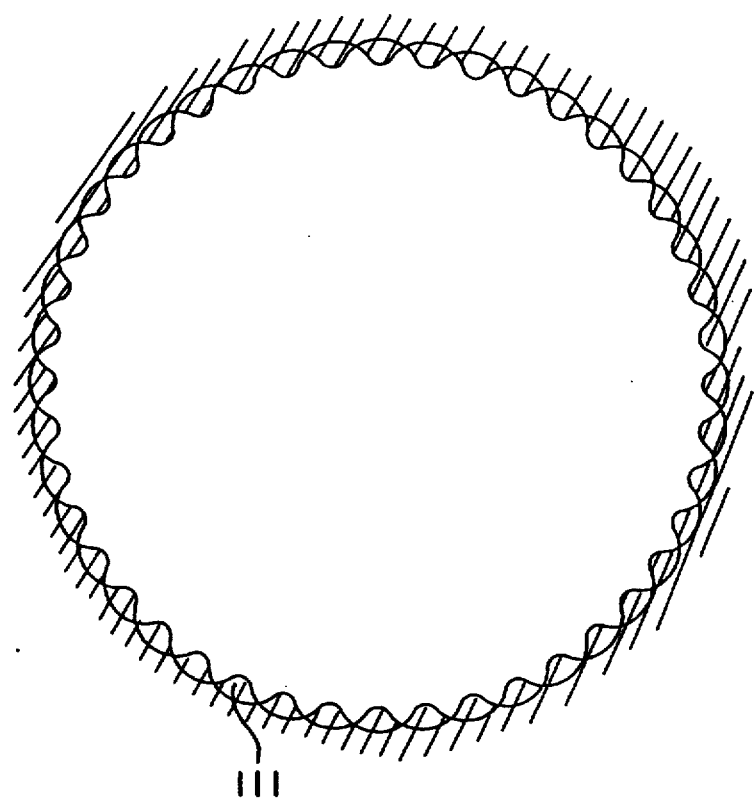
FIG. 3 is an enlarged view of the tooth profile (formed by superposing the trochoid internally enveloping lines) of internal teeth of an internal gear in the embodiment.

FIG. 1 is a sectional view of the main part of an internally meshing planetary gear structure according to the present invention, which is equivalent to the section taken along the line XII—XII of FIG. 11. As shown in FIG. 2, the tooth profile of the external teeth 109 of the external gears 5a and 5b is constituted of the innermost curve of two epitrochoid parallel curves superposed to be shifted in phase from each other by ½ of one tooth.

Also, the tooth profile of the internal teeth 111 of the internal gear 10 is constituted of the innermost curve of two trochoid internally enveloping lines including circular arc tooth profiles at both ends as described in the prior art which are superposed to be shifted in phase from each other by ½ of one tooth. In addition, the internal teeth 111 is not formed of pins but formed integrally with the main body material of the internal gear 10.

Here, the term "innermost" means the "center side" of the external gears 5a and 5b or the internal gear 10.

Figure 14:
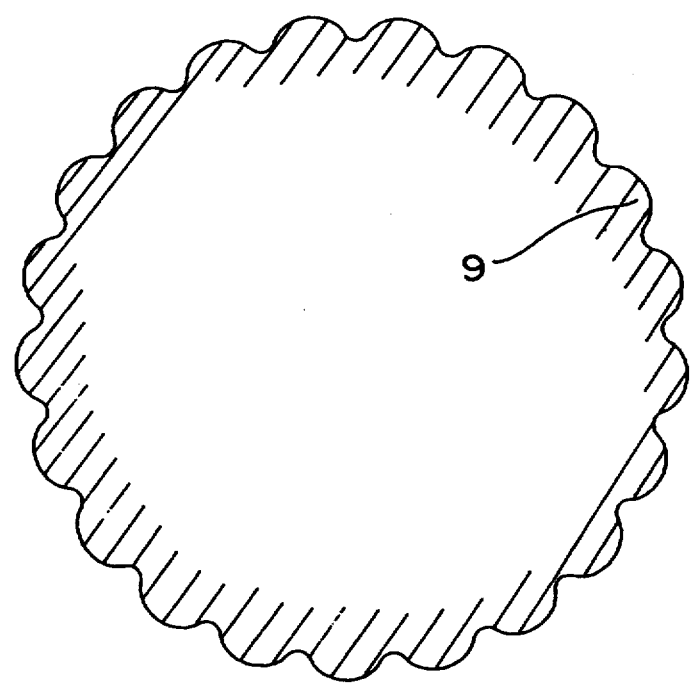
FIG. 14 is an enlarged view of the tooth profile (formed by superposing epitrochoid parallel curves) of external teeth of each external gear according to the prior art planetary reduction gear (difference in teeth number: 1)
Figure 15:
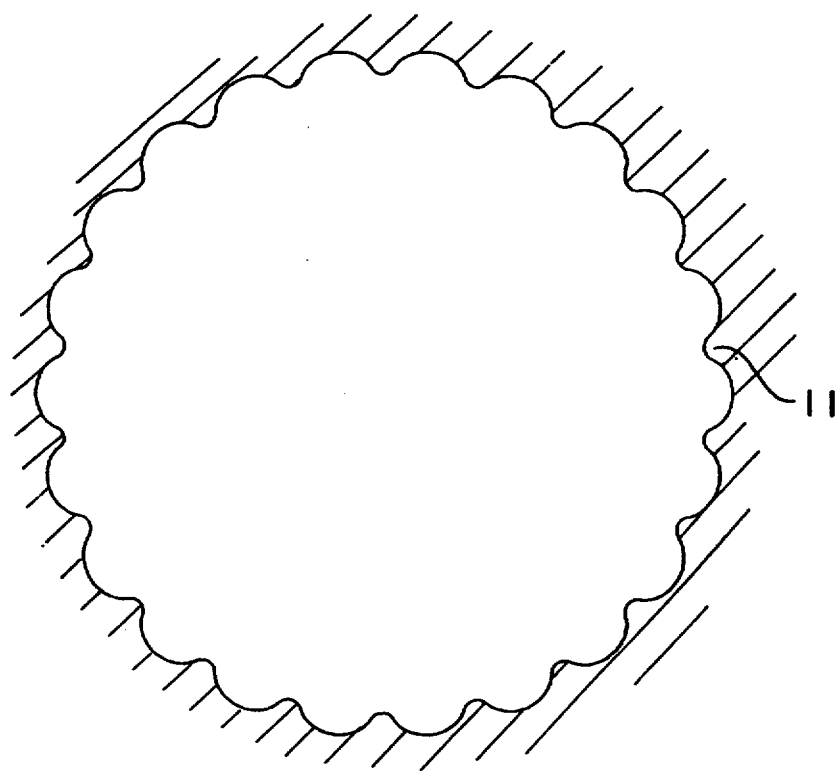
FIG. 15 is an enlarged view of the tooth profile (formed by superposing the trochoid internally enveloping lines) of internal teeth of an internal gear of the prior art planetary reduction gear (difference in teeth number: 1)

In the above, the basic superposed curves for the tooth profiles of the external teeth 109 and the internal teeth 111 are the tooth profile curves of the external teeth and the internal teeth as shown in Japanese Patent Publication No. sho 63-4056 (see FIGS. 14 and 15). Specifically, the epitrochoid parallel curve is taken as the basic curve for the external teeth 109. On the other hand, the internally enveloping line, which is formed by the external teeth composed of the epitrochoid parallel curve when the teeth number between the external teeth and the internal teeth is 1, is taken as the basic curve for the internal teeth 111.

The reason why two of the above curves are superposed to be shifted in phase from each other by ½ of one tooth is that the difference in the teeth number between the external teeth and the internal teeth is two. If the difference in the teeth number is 3, the innermost curve of three curves superposed to be shifted in phase from each other by ⅓ of one tooth is taken as the tooth profile curve. In the case that the difference in the teeth number is three or more, similarly, the tooth profile curve is obtained by superposing the curves in the same number as the difference N in the teeth number. In addition, in the case that the difference in the teeth number is two, the shifting of two curves is not necessarily to be ½ of one tooth; however, in such a case, the shifting amounts must be the same for the external gear and for the internal gear.

Also, in the case that the tooth profile is actually formed, the modification of the teeth may be made. For example, the teeth edges or teeth roots of the external teeth 109 and the internal teeth 111 are suitably rounded.

Figure 4:
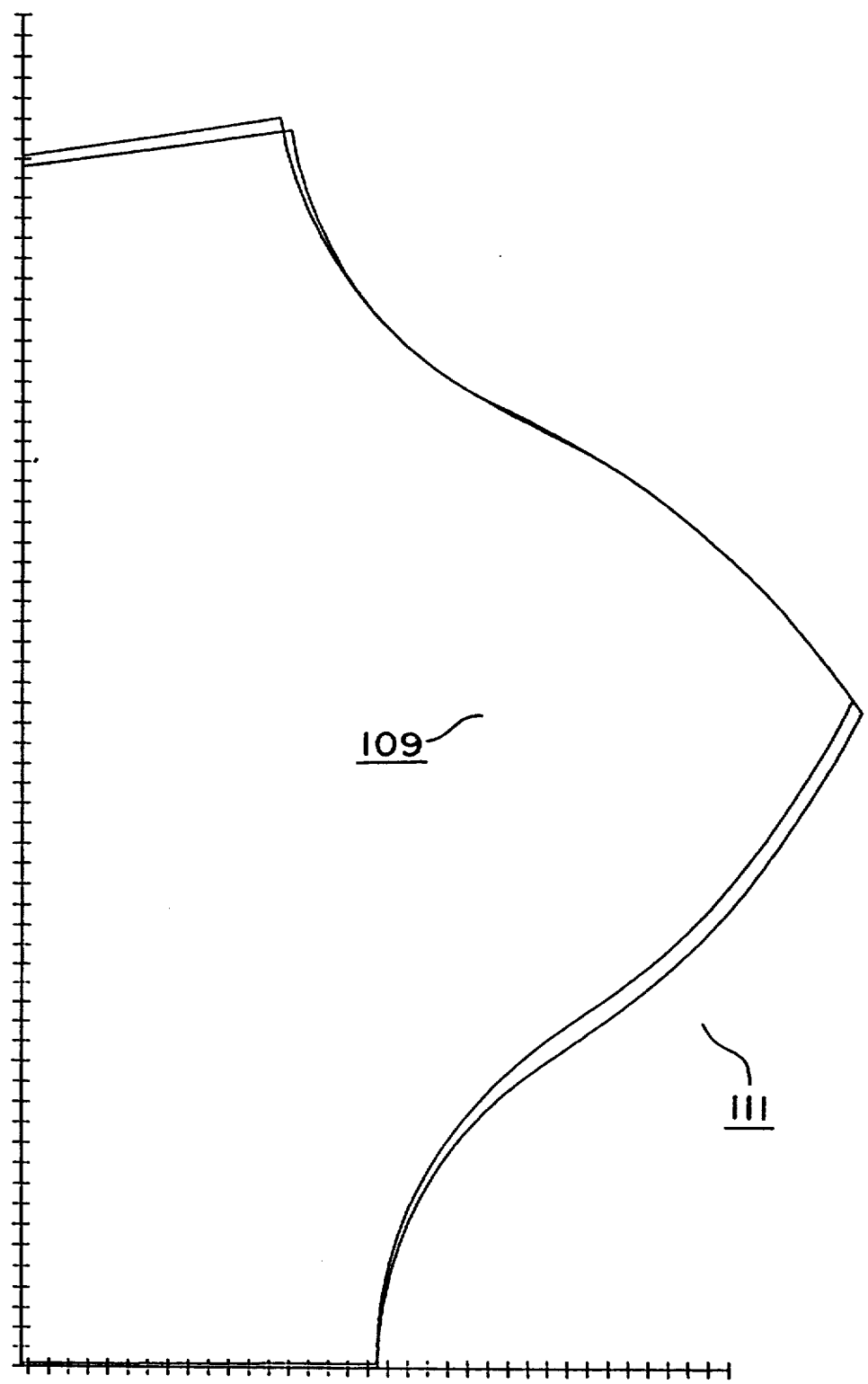
FIG. 4 is a partially enlarged view of a meshing portion between the external gear and the internal gear in the embodiment.
Figure 5:
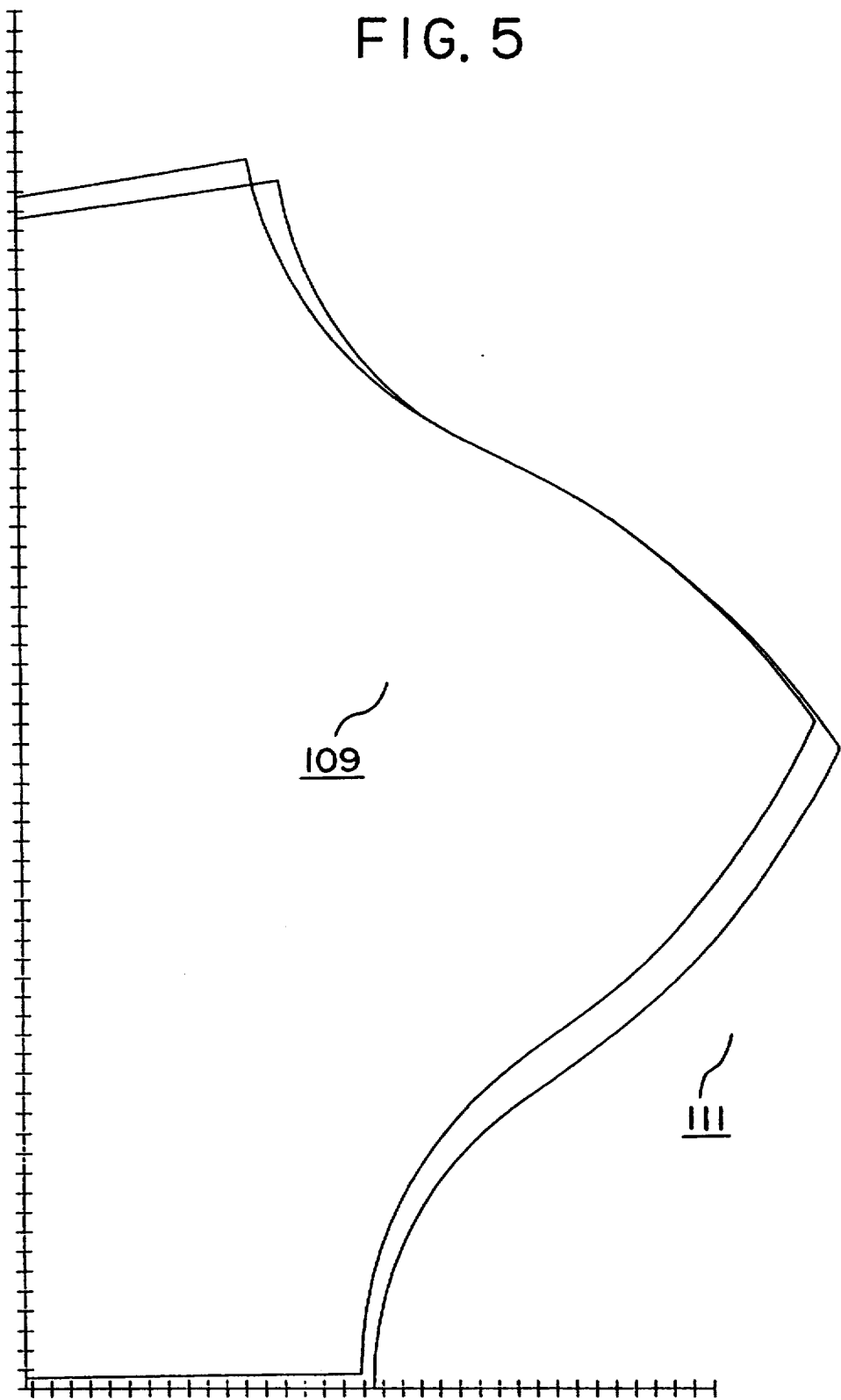
FIG. 5 is a view of a meshing portion where the rotational phase is slightly shifted from the condition of FIG. 4.

By constructing the external teeth 109 and the internal teeth 111 as described above, the external teeth 109 of the external gears 5a and 5b and the internal teeth 111 of the internal gear 10 are contacted with each other at two points in the area effective for the load transmission, Just as the gear of the device described in Japanese Patent Publication No. sho 63-4056. FIGS. 4 and 5 show meshing states between the external teeth 109 and the internal teeth 111 when the eccentric bodies 3a and 3b are rotated, in the gear meshing structure of this embodiment.

In this structure, as the input shaft is rotated by one time, the eccentric bodies 5a and 5b are rotated by one time. By one rotation of the eccentric bodies 5a and 5b, the external gears 5a and 5b are intended to be swayingly rotated around the input shaft 1; however, since the rotation thereof is restricted by the internal gear 10, the external gears 5a and 5b are substantially only swayed while internally meshing with the internal gear 10.

In this embodiment, the teeth number of the external gears 5a and 5b is 42, and the teeth number of the internal gear 10 is 44. Thus, the difference in the teeth number is 2. Accordingly, the external gears 5a and 5b are shifted (rotated) from the internal gear 10 fixed on the casing 12 by two teeth for each rotation of the input shaft 1. This means that one rotation of the input shaft 1 is reduced in the rotation of $-1/21$ of the external gears 5a and 5b.

In the rotation of the external gears 5a and 5b, the swaying component is absorbed by gaps among the internal roller holes 6a and 6b and the internal pins 7 (internal rollers 8), and only the rotational component is transmitted to the output shaft 2 through the inner pins 7. As a result, the reduction with the reduction ratio $-1/21$ is achieved.

In the case where the same reduction ratio ($-1/21$, in this embodiment) is obtained in the prior art and in this embodiment, the teeth number of the external gears 5a and 5b and the internal gear 10 are respectively 21 and 22 for the prior art, and are 42 and 44 for this embodiment. The teeth number in the present invention becomes twice as much as the prior art. Accordingly, it is possible to double the meshing teeth number in the area effective for the load transmission, and to eliminate the meshing in the area not effective for the power transmission and being large in the sliding. Therefore, it is possible to improve the load capacity of the gear (strength of the gear, anti-scoring property), and hence to obtain the lightweight and compact reduction gear.

As explained above, according to the internally meshing planetary gear structure of the present invention, even if the difference in the teeth number-between the external teeth of the external gear and the internal teeth of the internal gear is two or more, it is possible to secure two of the meshing points. This makes it possible to reduce the load applied to each tooth due to an increase in the teeth number while reducing the pressure applied to the teeth surface, and hence to improve the strength of the gear. Therefore, it is possible to obtain the lightweight, compact and high performance reduction or speed up gear.

On the other hand, hereinafter, one embodiment of flexible meshing type gear meshing structure will be explained with reference to the accompanying drawings.

Figure 16:
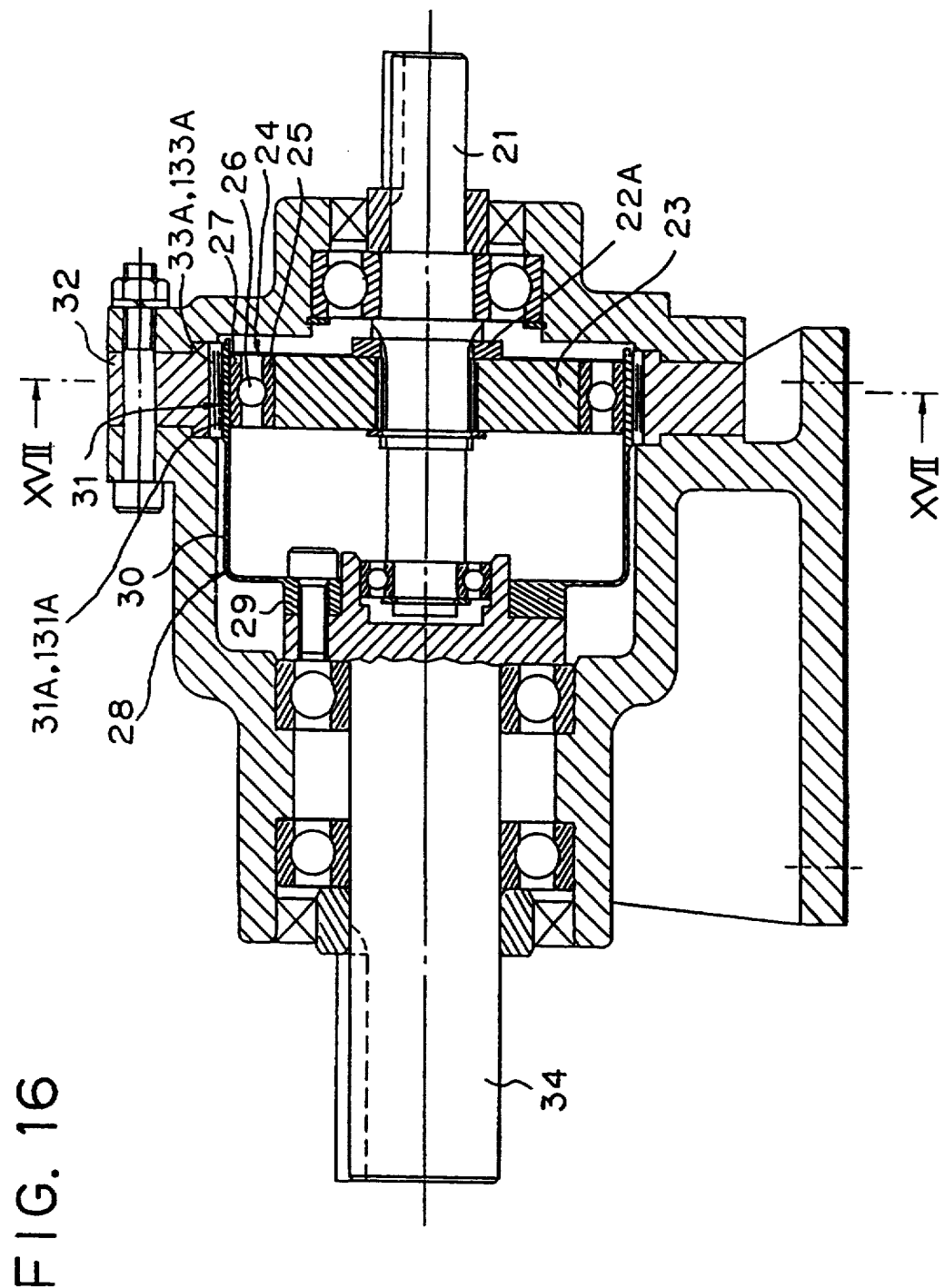
FIG. 16 is a sectional view showing the whole construction of an example of a flexible meshing type gear meshing structure common to the embodiment of the present invention and the prior art.
Figure 17:
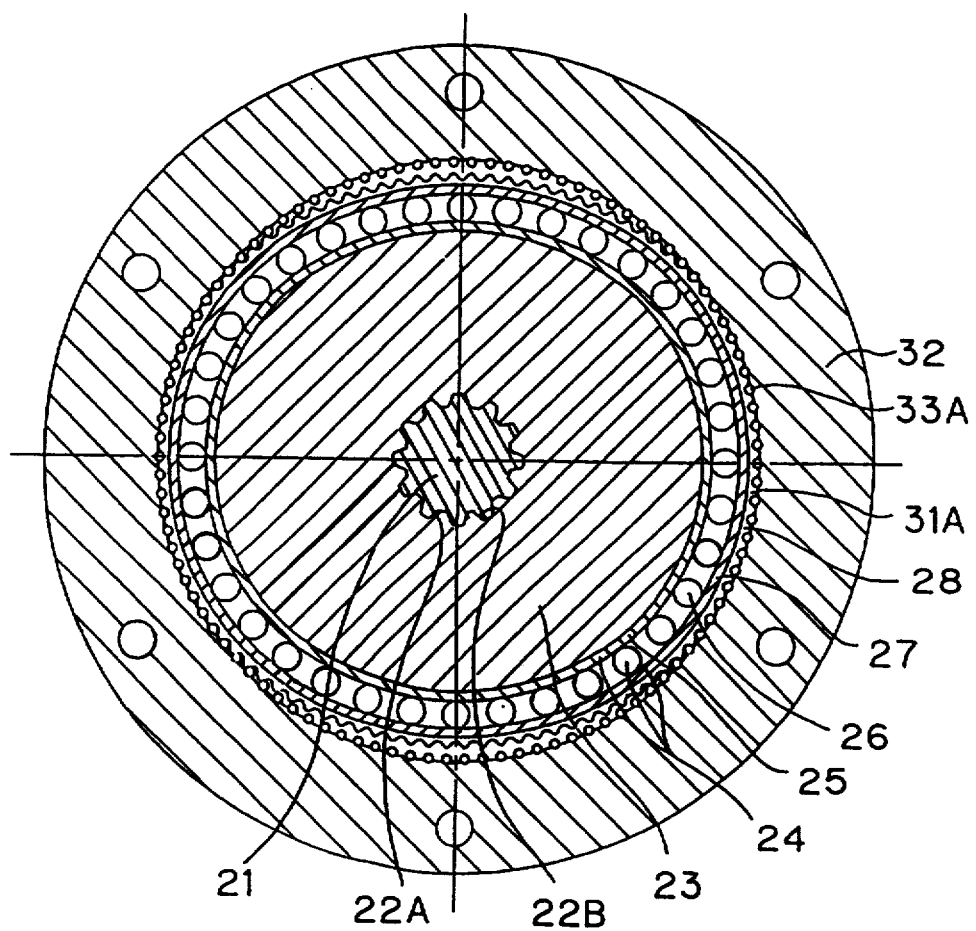
FIG. 17 is a sectional view taken along the line XVII—XVII of FIG. 16.

The gear meshing structure of this embodiment has the same construction as that shown in FIG. 16, 17, except that the tooth profile of external teeth (indicated at numeral 131A) and the tooth profile of internal teeth (indicated at numeral 133A) are different from those in the prior art. Accordingly, there will be mainly explained the tooth profiles of the external teeth 131A and internal teeth 133A, wherein only the numerals are displaced.

Figure 6:
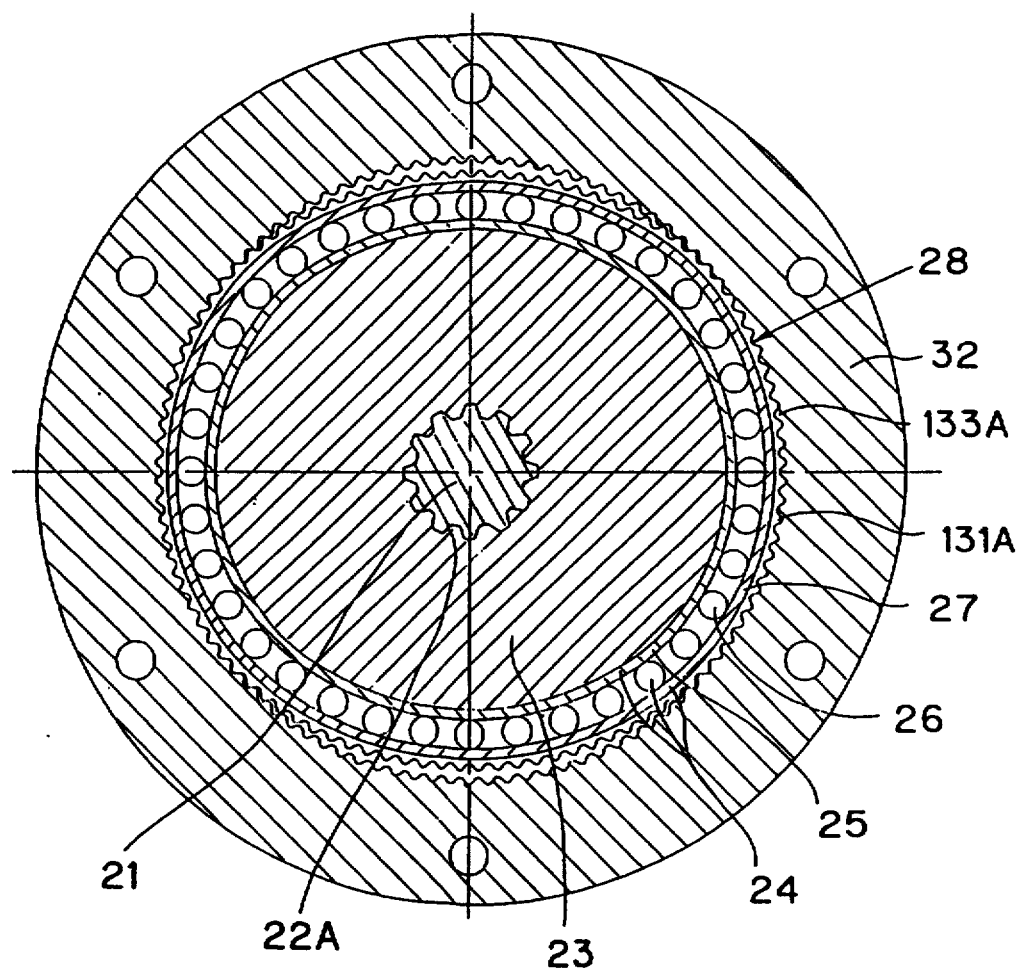
FIG. 6 is a sectional view showing the main part of another embodiment of the present invention, which is equivalent to the section taken along the line XVII—XVII of FIG. 16.
Figure 7:
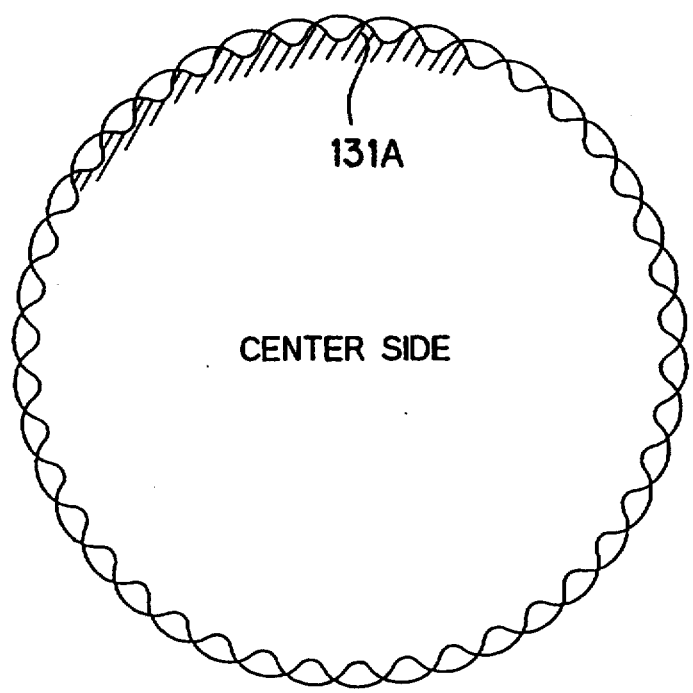
FIG. 7 is an enlarged view of the tooth profile (formed by superposing epitrochoid parallel curves) of each external gear in the embodiment.

FIG. 6 is a sectional view of the main part of an flexibly meshing type gear meshing structure according to the present invention, which is equivalent to the section taken along the line XVII—XVII of FIG. 16. As shown in FIG. 7, the tooth profile of the external teeth 131A of the external gears is constituted of the innermost curve of two epitrochoid parallel curves superposed to be shifted in phase from each other by $\frac{1}{2}$ of one tooth.

Figure 8:
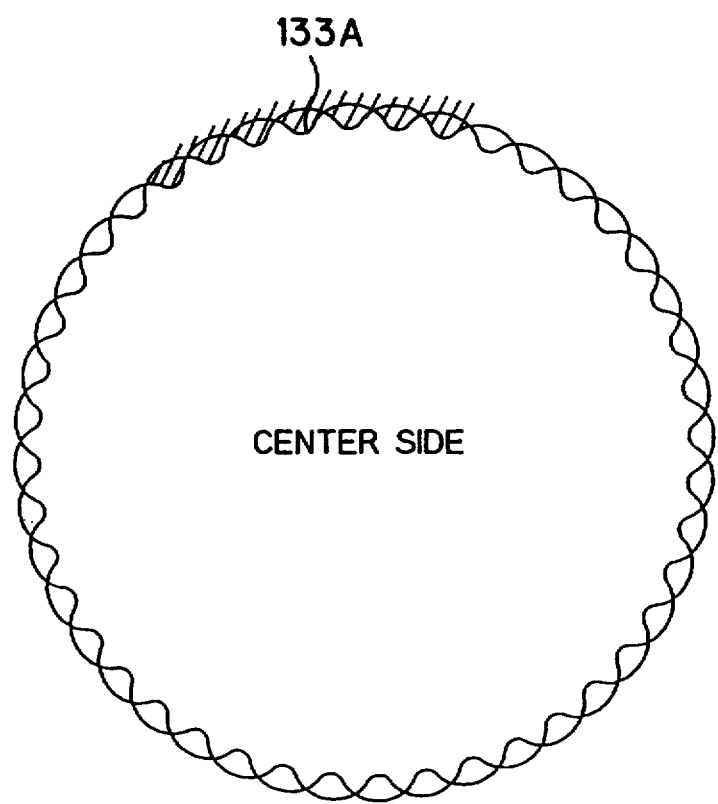
FIG. 8 is an enlarged view of the tooth profile (formed by superposing the trochoid internally enveloping lines) of internal teeth of an internal gear in the embodiment.

Also, the tooth profile of the internal teeth 133A of the internal gear 32 is constituted of the innermost curve of two trochoid internally enveloping lines which are superposed to be shifted in phase from each other by $\frac{1}{2}$ of one tooth as shown in FIG. 8. The internal teeth 133A is not formed of pins but formed integrally with the main body material of the internal gear 32.

Here, the term "innermost" means the "center side" of the external gear 28 or the internal gear 32.

In the above, the basic superposed curves for the tooth profiles of the external teeth 131A and the internal teeth 133A are the tooth profile curves of the external teeth and the internal teeth as shown in Japanese Patent Publication No. sho 63-4056 (see FIGS. 14 and 15). Specifically, the epitrochoid parallel curve is taken as the basic curve for the external teeth 131A. On the other hand, the internally enveloping line, which is formed by the external teeth composed of the epitrochoid parallel curve in the case where the teeth number between the external teeth and the internal teeth is 1, is taken as the basic curve for the internal teeth 133A.

The reason why two of the above curves are superposed to be shifted in phase from each other by $\frac{1}{2}$ of one tooth is that the difference in the teeth number between the external teeth and the internal teeth is two. If the difference in the teeth number is 3, the innermost curve of three curves superposed to be shifted in phase from each other by $\frac{1}{3}$ of one tooth is taken as the tooth profile curve. In the case that the difference in the teeth number is three or more, similarly, the tooth profile curve is obtained by superposing the curves in the same number as the difference N in the teeth number. In addition, in the case where the difference in the teeth number is two, the shifting of two curves is not necessarily to be $\frac{1}{2}$ of one tooth; however, in such a case, the shifting amounts must be the same for the external gear and for the internal gear.

Also, in the case that the tooth profile is actually formed, the modification of the teeth may be made. For example, the teeth edges or teeth roots of the external teeth 131A and the internal teeth 133A are suitably rounded.

Figure 9:
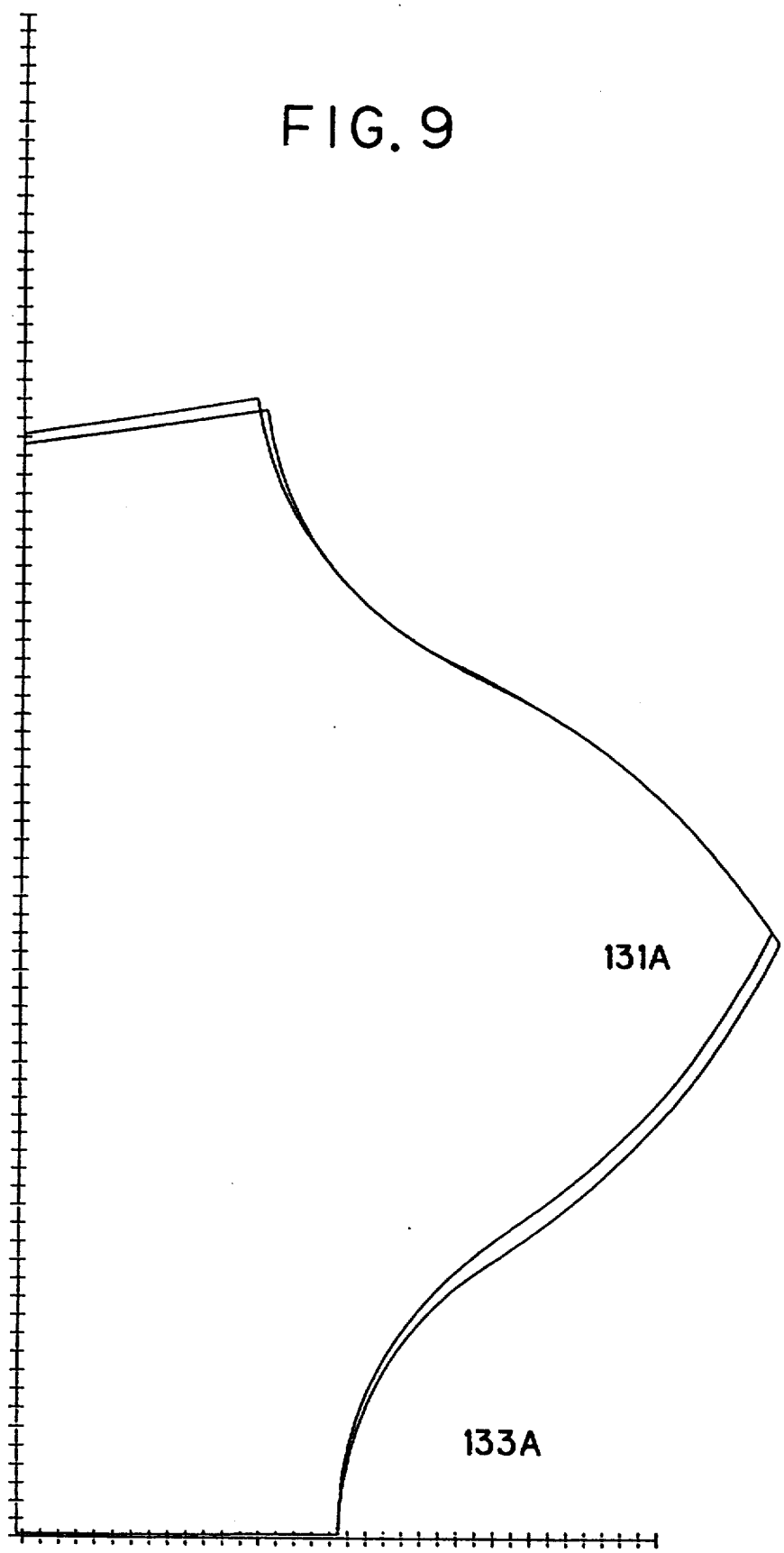
FIG. 9 is a partially enlarged view of a meshing portion between the external gear and the internal gear of the embodiment.
Figure 10:
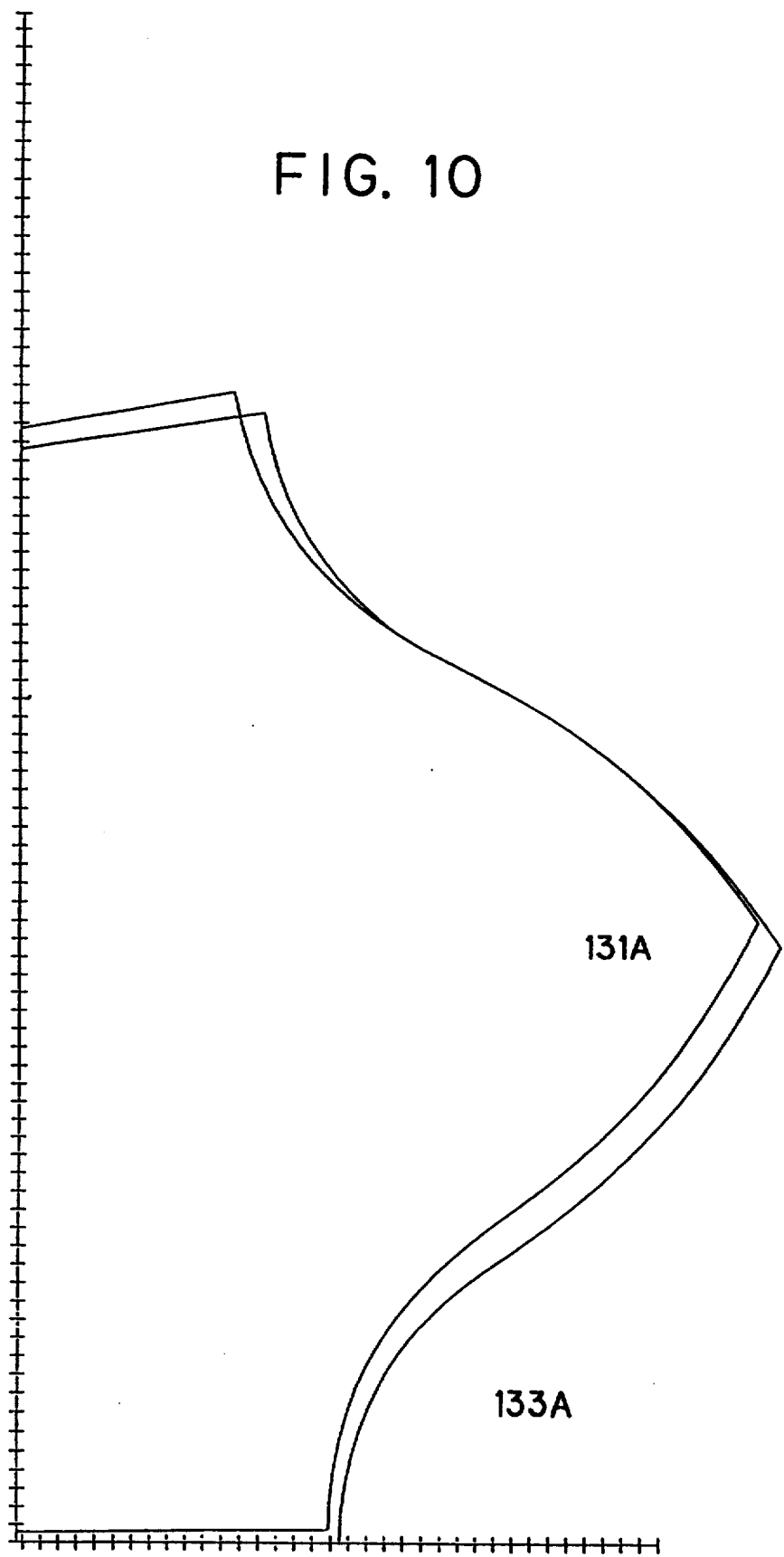
FIG. 10 is a view of a meshing portion where the rotational phase is slightly shifted from the condition of FIG. 9.

By constructing the external teeth 131A and the internal teeth 133A as described above, the external teeth 131A of the external gear 28 and the internal teeth 133A of the internal gear 32 are contacted with each other at two points in the area effective for the load transmission, just as the gear of the device described in Japanese Patent Publication No. sho 63-4056. FIGS. 9 and 10 show meshing states between the external teeth 131A and the internal teeth 133A when the eccentric body 23 is rotated, in the gear meshing structure of this embodiment.

According to the flexible meshing type gear meshing structure of the present invention,-since the meshing points between the external teeth of the external gear and the internal teeth of the internal gear are increased as compared with the prior art structure, it is possible to improve the load ability of the gear. Therefore, it is possible to obtain the lightweight, compact and high performance reduction or speed up gear.

What is claimed is:

1. An internally meshing planetary gear structure comprising:
    a first shaft;
    plural external gears mounted around said first shaft through plural eccentric bodies provided around said first shaft so as to be eccentrically rotatable;
    an internal gear internally meshing with said external gears; and
    a second shaft connected to said external gears through means for transmitting only rotational component of said external gears;
    wherein the difference in the teeth number between each of said external gears and said internal gear is set to be N (N: integer being two or more);
    the tooth profile of said external gear is constructed on the basis of the innermost curve of the epitrochoid parallel curves in N pieces which are superposed to be shifted in phase from each other; and
    the tooth profile of said internal gear is constructed on the basis of the innermost curve of the trochoid internally enveloping curves in N pieces which mesh with the above epitrochoid parallel curves and which are superposed to be shifted from each other by the same phase as in said external gear.

2. An internally meshing planetary gear structure according to claim 1, wherein said phase-shifting amounts of the epitrochoid parallel curves in N pieces according to the external gear, and the trochoid internally enveloping lines in N pieces according to the internal gear are respectively set to be 1/N of one tooth.

* * * * *